US008441757B2

(12) United States Patent
Chen et al.

(10) Patent No.: US 8,441,757 B2
(45) Date of Patent: *May 14, 2013

(54) PERPENDICULAR MAGNETIC WRITE HEAD WITH WRAP-AROUND SHIELD, SLANTED POLE AND SLANTED POLE BUMP FABRICATED BY DAMASCENE PROCESS

(75) Inventors: Yingjian Chen, Fremont, CA (US); Liubo Hong, San Jose, CA (US); Yimin Hsu, Sunnyvale, CA (US); Edward Hin Pong Lee, San Jose, CA (US); Katalin Pentek, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 508 days.

This patent is subject to a terminal disclaimer.

(21) Appl. No.: 12/634,456

(22) Filed: Dec. 9, 2009

(65) Prior Publication Data

US 2011/0134567 A1 Jun. 9, 2011

(51) Int. Cl.
*G11B 5/11* (2006.01)
*G11B 5/187* (2006.01)

(52) U.S. Cl.
USPC ............ 360/125.13; 360/119.03; 360/119.04; 360/125.12; 360/125.3

(58) Field of Classification Search ............ 360/125.03, 360/125.12, 125.3, 119.02, 119.03, 119.04, 360/125.04, 125.08, 125.13
See application file for complete search history.

(56) References Cited

U.S. PATENT DOCUMENTS

| 6,710,973 | B2 | 3/2004 | Okada et al. ................. 360/125 |
|---|---|---|---|
| 7,392,577 | B2 | 7/2008 | Yazawa et al. ............. 29/603.12 |
| 7,995,307 | B2 * | 8/2011 | Zheng ...................... 360/125.13 |
| 2005/0083608 | A1 | 4/2005 | Watanabe ................... 360/126 |
| 2005/0219747 | A1 * | 10/2005 | Hsu et al. ...................... 360/126 |
| 2006/0082924 | A1 | 4/2006 | Etoh et al. .................... 360/125 |
| 2007/0014049 | A1 * | 1/2007 | Yazawa ........................ 360/126 |
| 2008/0002293 | A1 | 1/2008 | Sasaki et al. ................. 360/126 |
| 2008/0112081 | A1 | 5/2008 | Matono ................... 360/125.08 |
| 2008/0151437 | A1 | 6/2008 | Chen et al. .................... 360/319 |
| 2008/0187654 | A1 | 8/2008 | Kamijima et al. ............ 427/129 |
| 2009/0002885 | A1 | 1/2009 | Sin .......................... 360/125.02 |
| 2009/0059426 | A1 * | 3/2009 | Sasaki et al. ............. 360/125.02 |
| 2009/0122445 | A1 * | 5/2009 | Jiang et al. .............. 360/123.12 |
| 2009/0279207 | A1 * | 11/2009 | Sasaki et al. ............. 360/125.03 |

(Continued)

FOREIGN PATENT DOCUMENTS

| JP | 2007/168821 | 6/2007 |
|---|---|---|
| JP | 2007/257711 | 10/2007 |
| JP | 2009/026375 | 2/2009 |

OTHER PUBLICATIONS

T. Okada et al., "Narrow track fabricating process for perpendicular recording heads" Record of Electrical and Communication E., 2007, vol. 75, No. 2; pp, 104-107; Supplied by the British Library.

*Primary Examiner* — Jefferson Evans
(74) *Attorney, Agent, or Firm* — Zilka-Kotab, PC

(57) ABSTRACT

A magnetic write head having a write pole with a tapered trailing edge. The write head has a non-magnetic step layer and a non-magnetic bump formed on the front edge of the magnetic step layer. A non-magnetic trailing gap layer is formed over the tapered trailing edge of the write pole and over the non-magnetic bump and over the non-magnetic step layer. A magnetic trailing shield is formed over at least a portion of the non-magnetic gap layer.

10 Claims, 25 Drawing Sheets

U.S. PATENT DOCUMENTS

| | | |
|---|---|---|
| 2010/0128392 A1* | 5/2010 | Bonhote et al. .......... 360/125.03 |
| 2010/0172054 A1* | 7/2010 | Yamaguchi et al. ..... 360/125.03 |
| 2011/0134568 A1* | 6/2011 | Chen et al. ............... 360/123.12 |
| 2011/0134569 A1* | 6/2011 | Allen et al. .............. 360/123.12 |
| 2011/0135962 A1* | 6/2011 | Hong et al. ................... 428/815 |

* cited by examiner

PERPENDICULAR MAGNETIC WRITE HEAD WITH WRAP-AROUND SHIELD, SLANTED POLE AND SLANTED POLE BUMP FABRICATED BY DAMASCENE PROCESS

FIELD OF THE INVENTION

The present invention relates to magnetic heads for data recording, and more particularly to a method for manufacturing a perpendicular magnetic write head with high write field, high field gradient and which avoids adjacent track erasure.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos\theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

In a perpendicular magnetic recording system, it is desirable to maximize write field strength and also maximize field gradient. A strong write field ensures that a magnetic bit can be recorded in the magnetically hard top layer of the magnetic medium. A high field gradient allows for fast magnetic switching of the magnetic field from the write pole, thereby increasing the speed with which the magnetic transitions can be recorded. It is desirable to maximize both of these parameters, while also ensuring that the magnetic write pole does not become magnetically saturated at the pole tip.

SUMMARY OF THE INVENTION

The present invention provides a magnetic write head that includes: a magnetic write pole; a non-magnetic step layer formed over a portion of the write pole and terminating at an end that is removed from an air bearing surface; a tapered trailing edge formed on the write pole, the tapered trailing edge being located between the end of the non-magnetic step layer and the air bearing surface; a non-magnetic bump formed on the end of the non-magnetic step layer and a portion of the trailing edge of the write pole; a non-magnetic trailing gap layer formed over the write pole, the non-magnetic bump and the non-magnetic step layer; and a magnetic trailing shield formed over at least a portion of the non-magnetic trailing gap layer.

The tapered trailing edge of the write pole has a tapered magnetic portion between the non-magnetic step layer and the air bearing surface. There is also a nonmagnetic bump in front of the nonmagnetic step layer that further separates the magnetic portion of the write pole from trailing edge shield. The nonmagnetic bump can be made possible by shadowing from the magnetic step layer during an ion milling process used to form the side gap of the wrap around shield.

The tapered trailing edge helps to focus magnetic flux to the tip of the write pole. The non-magnetic step layer also helps to focus magnetic flux to the pole tip region of the write pole while avoiding saturation of the write pole. The non-magnetic bump formed at the front edge of the magnetic step layer helps to increase magnetic spacing at this location in order to prevent magnetic field from being lost to the trailing shield (thereby maximizing write field strength).

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
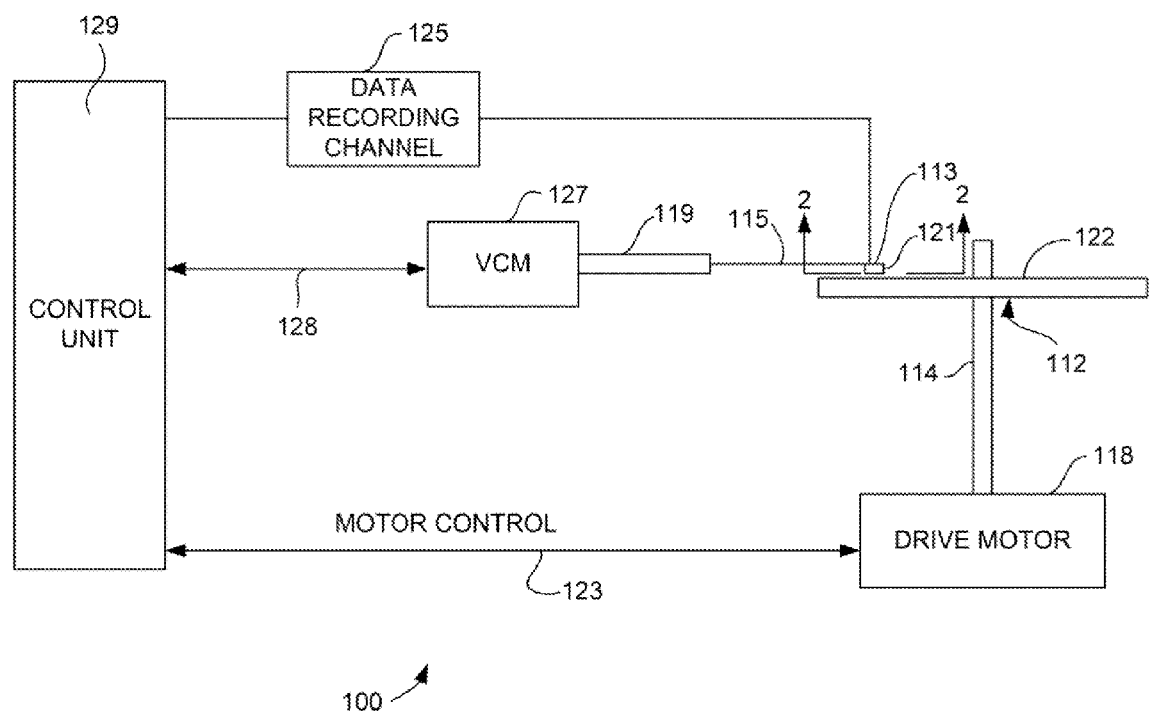
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
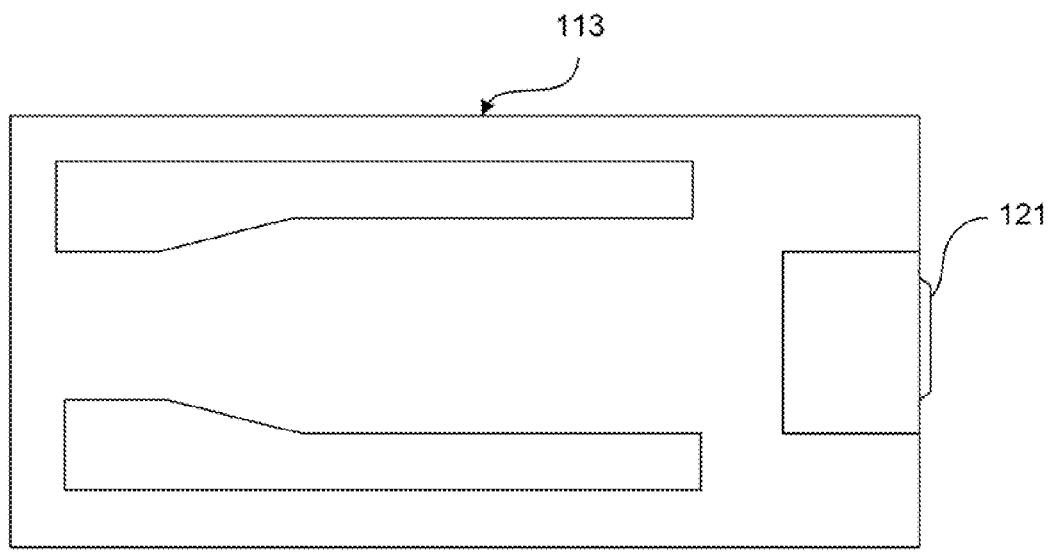
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
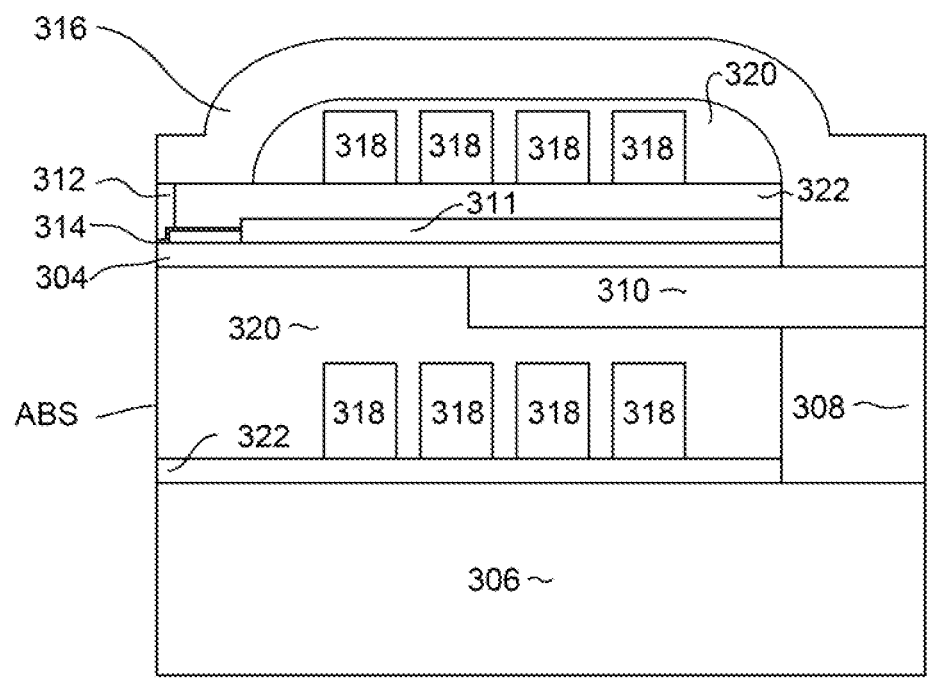
FIG. 3 is a cross sectional view of a magnetic head according to an embodiment of the present invention.

With reference now to FIG. 3, the invention can be embodied in a magnetic head 302 having a tapered write pole and with a non-magnetic bump. The write head 302 includes a magnetic write pole 304, and a magnetic return pole 306, both of which extend to an air bearing surface (ABS). A magnetic back gap layer 308 can be magnetically connected with the return pole 306 in a region removed from the ABS. However, the magnetic back gap 308 is optional. A magnetic shaping layer 310 can be connected with the back gap layer 308 and also with the write pole 304. Another magnetic layer 311 can be formed over the top of the write pole 304. This layer 311 also functions as a shaping layer to channel magnetic flux to the write pole 304.

In order to increase field gradient to increase the speed with which magnetization of the write field can be switched, a trailing magnetic shield 312 is provided at the ABS, adjacent to the trailing edge of the write pole. The trailing shield 312 is separated from the write pole 304 by a non-magnetic trailing gap layer 314. A trailing return pole 316 can be provided to conduct magnetic flux from the trailing shield 312 to the shaping layer 310 and back gap 308.

A non-magnetic, electrically conductive write coil 318 passes above and below the write pole 304 and shaping layer 310. The write coil (shown partially and in cross section in FIG. 3) can be constructed of a material such as Cu, and when an electrical current flows through the write coil 318, a resulting magnetic field causes a magnetic flux to flow through the return pole 306, back gap 308 and write pole 304. The write coil 318 can be encased within a non-magnetic, electrically insulating fill layer 320, such as alumina and or hard baked photoresist, and can be formed on a non-magnetic, electrically insulating under-layer 322, which also can be a material such as alumina.

Figure 4:
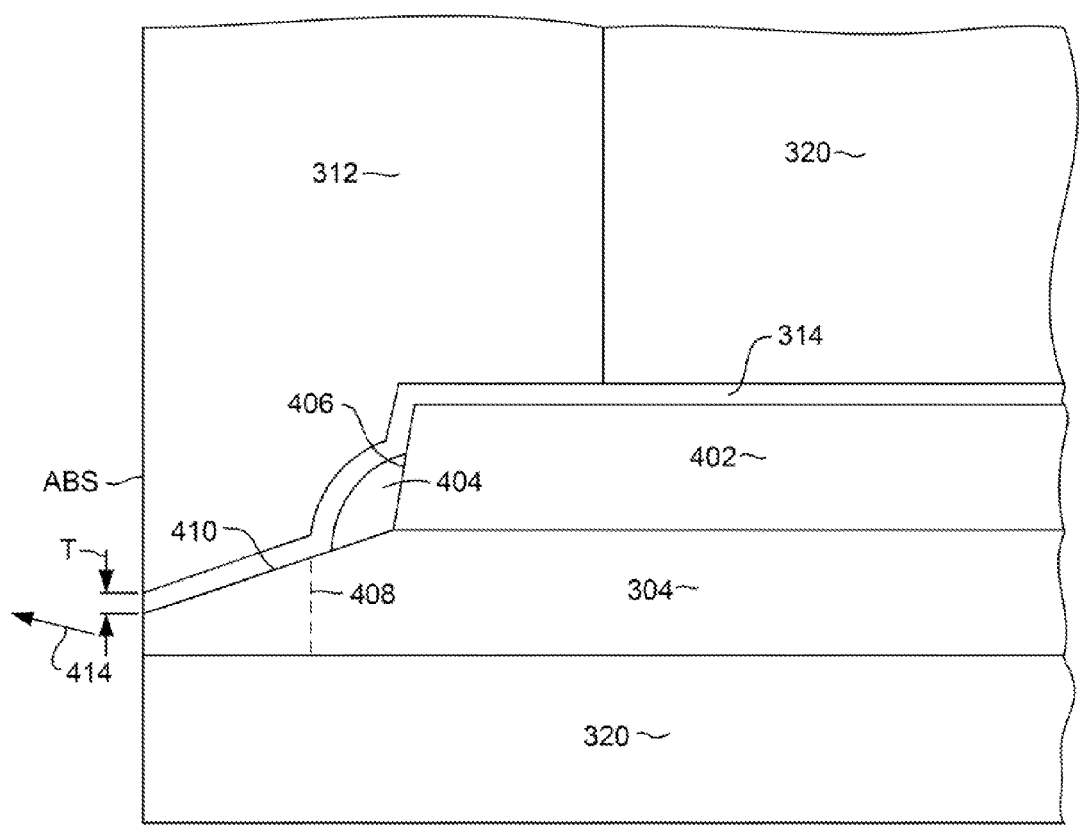
FIG. 4 is an enlarged view of a pole tip region of the magnetic recording head of FIG. 3.

The pole tip region of the write pole 314 can be seen more clearly with reference to FIG. 4, which shows an enlarged view of the pole tip portion of the write pole 304 and surrounding structure. A non-magnetic step layer 402 is formed over the write pole 304, and can be constructed primarily of non-magnetic materials such as NiCr or Cr. This non-magnetic step layer 402 is also a trailing edge taper mask, as will become clearer below, and may include a hard mask layer such as SiC or diamond like carbon (DLC) which will be discussed in greater detail below.

The non-magnetic step layer 402 has a front edge 406, at an end closest to the ABS that may be slightly tapered backward relative to the ABS. A non-magnetic bump layer 404 is formed at the front edge 406 of the magnetic step layer 402. The front edge 406 is recessed from the ABS by a desired amount. The desired dimension of the front edge recess (distance between the ABS and the front edge 406) is between 100-250 nm. The distance between the front edge of non-magnetic bump 404 to ABS is about 50-150 nm. The flare point of the write pole is about 50-120 nm.

As can be seen, the write pole 304 has a tapered or sloped trailing edge having a taper portion 410 between the nonmagnetic step and ABS. As can be seen, the trailing edge taper 410 terminates at the front edge 406 of the non-magnetic step layer 402. This is a result of manufacturing processes that will be described further below.

The presence of the non-magnetic step layer 402 helps to reduce magnetic flux loss between the pole tip portion of the write pole 304 and the trailing shield 312. The tapered trailing edge portion, 412 further promotes the focusing of magnetic flux to the pole tip while avoiding magnetic saturation of the pole tip portion of the write pole 304.

The trailing magnetic shield 312 helps to increase the field gradient of the magnetic write field 414 emitted from the tip of the write pole 304. This increase in field gradient helps to define a shaper written transition, thereby improving signal-to-noise ratio and increasing data density.

Optimal functioning of the trailing shield involves a tradeoff between maximizing field gradient improvements and minimizing the loss of write field to the trailing shield. The write head is preferably designed so as to prevent magnetic saturation of the trailing shield 312. In addition, the spacing between the write pole 402 and the trailing shield 312 is preferably such that the write field is maximized at the tip of the write pole 402, and also such that little write field leaks from the write pole 402 to the trailing shield 312.

The present invention optimizes both of these goals. The write gap 314 has a thickness "T" that provides a desired spacing between the write pole 304 and the trailing shield 312 at the pole tip. This spacing T can therefore be controlled by controlling the as deposited thickness of the trailing gap layer 314.

The location of the front edge 406 of the magnetic step layer 402, as well as the initiation point of the steep tapered trailing edge portion 410 of the write pole 304 are critical regions for the leakage of flux from the write pole 304 to the trailing shield. This is because of the sudden channeling of magnetic flux from the write pole 304 into a much smaller pole tip portion of the write pole 304. In order to prevent the leakage of magnetic flux at this point, the non-magnetic bump 404 and the non-magnetic step 402 advantageously increases the magnetic spacing between the trailing shield 312 and the write pole 304. As can be seen, the spacing between the write pole 304 and the trailing shield 312 at this point is the sum of the thickness of the bump 404 and the thickness of the gap layer 314 in the region immediately in front of the step 402, and the spacing is the sum of the step 402 and the thickness of the gap layer 314 behind the step 402. The non-magnetic bump 404 can be constructed of a material such as alumina and can be formed by a manufacturing process that will be described in greater detail herein below.

Figure 5:
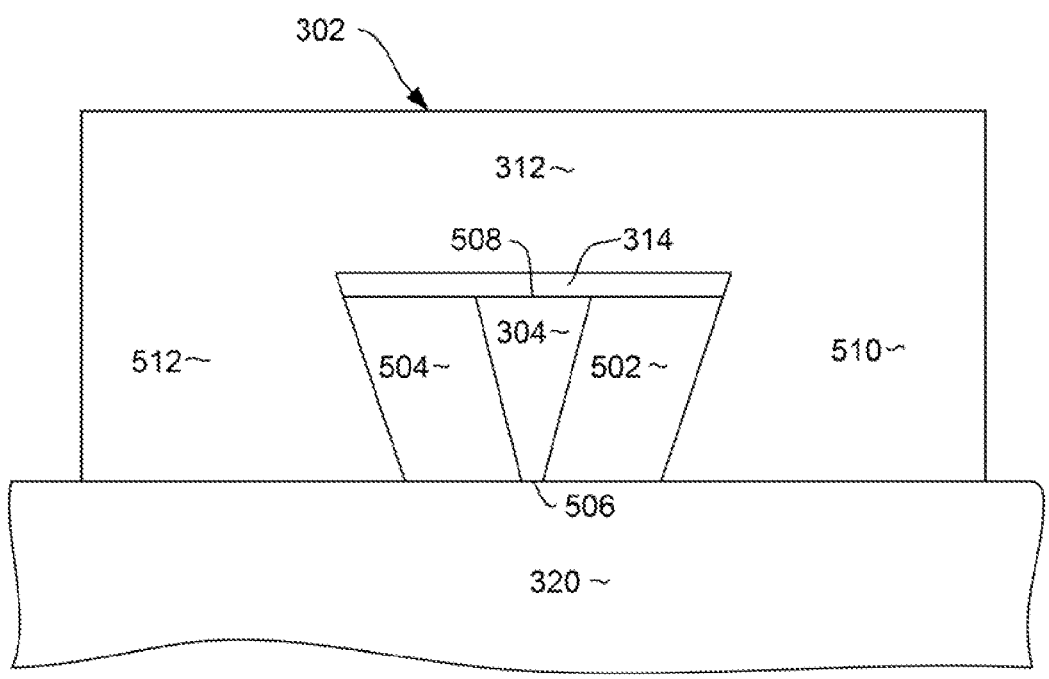
FIG. 5 is an ABS view of the magnetic recording head of FIGS. 3 and 4.

FIG. 5 shows an enlarged view of a portion of the write head 302 as viewed from the air bearing surface ABS. As can be seen, the write pole 304 as viewed from the ABS has a narrow, trapezoidal shape. In fact, the tip of the write pole 304 is so narrow that is nearly resembles a triangular shape, having a leading edge 506 that is extremely small (smaller than the trailing edge 508), the leading edge 506 of the write pole 304 defining the track width of the write pole 304. Also as can be seen in FIG. 5, the trailing shield 312 is actually a wrap-around trailing shield, having side portions 510, 512 that extend down the sides of the write pole 304. The side portions 510, 512 of the shield 312 are separated from the write pole 304 by first and second side gap layers 502, 504 that can be constructed of a non-magnetic material such as alumina. The construction of the write pole 304, side gaps 502, 504, trailing gap 314 and shield 312 will be described in greater detail below.

Figure 6:
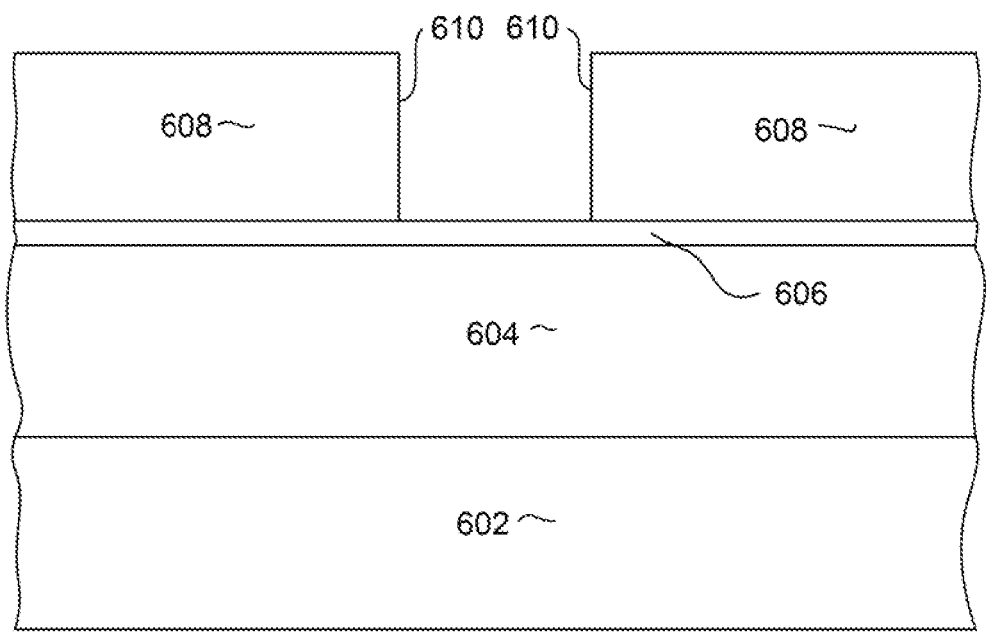
FIGS. 6-23, are views of a portion of a magnetic write head in various intermediate stages of manufacture, illustrating a method for manufacturing a magnetic write head according to an embodiment of the invention.
Figure 7A:
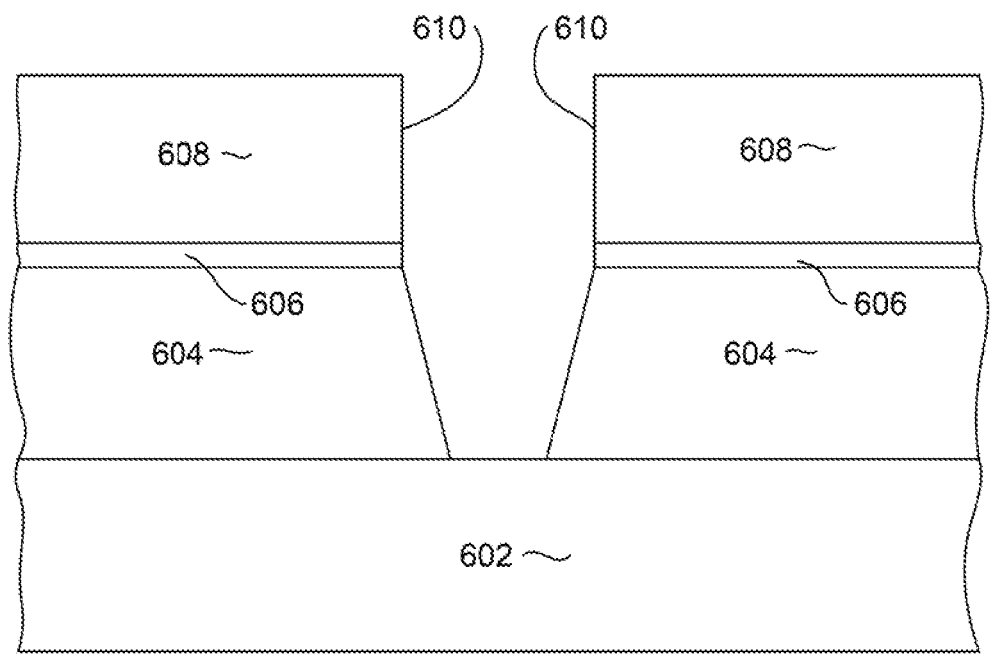

With reference to FIGS. 6-23 a method for manufacturing a magnetic write head according to a possible embodiment of the invention is described. With particular reference to FIG. 6, a substrate 602 is provided. This substrate 602 can include the non-magnetic fill layer 320 and all or a portion of the shaping layer 310, both of which were described above with reference to FIG. 3. A layer of material that can be removed by reactive ion etching (RIEable fill layer) 604 is deposited over the substrate 602. The RIEable layer 604 can be constructed of a material such as $SiO_2$, of alumina. A thin RIE hard mask layer 606 is then deposited over the RIEable fill layer 604. There are two different methods to define the pattern of hard mask. In the method described in FIGS. 6 and 7(a) RIE hard mask 606 is first deposited on the fill layer 604, and then a photoresist mask is formed with an opening 610 shaped to define a write pole, but which is slightly larger than the finished write pole shape. An ion milling step is then needed to transfer the photoresist pattern 608 into RIE hard mask. In this case, RIE of the RIEable fill layer 604 proceeds with the photo mask 608 remaining on the wafer.

Figure 7B:
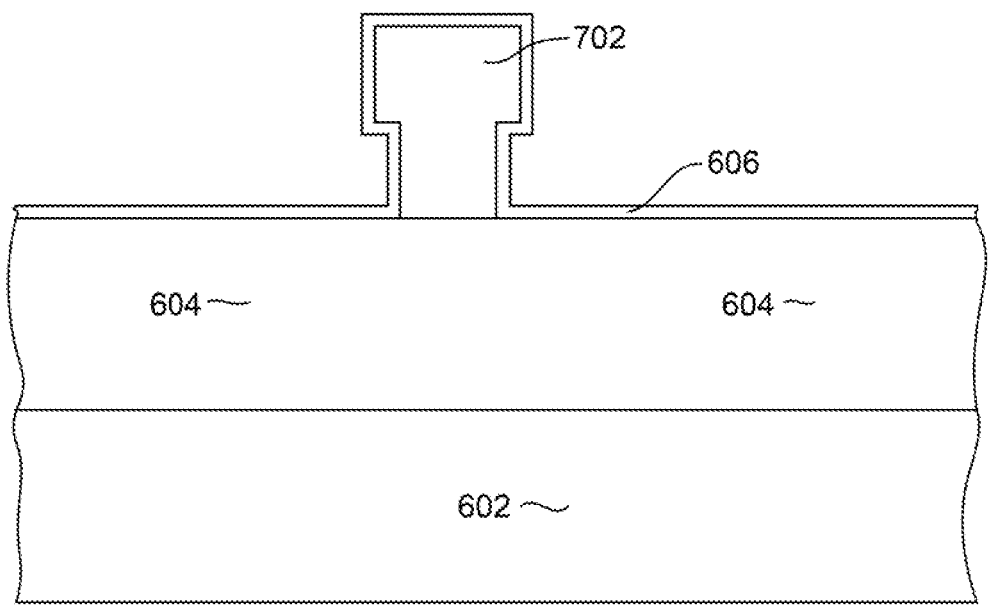
Figure 7C:
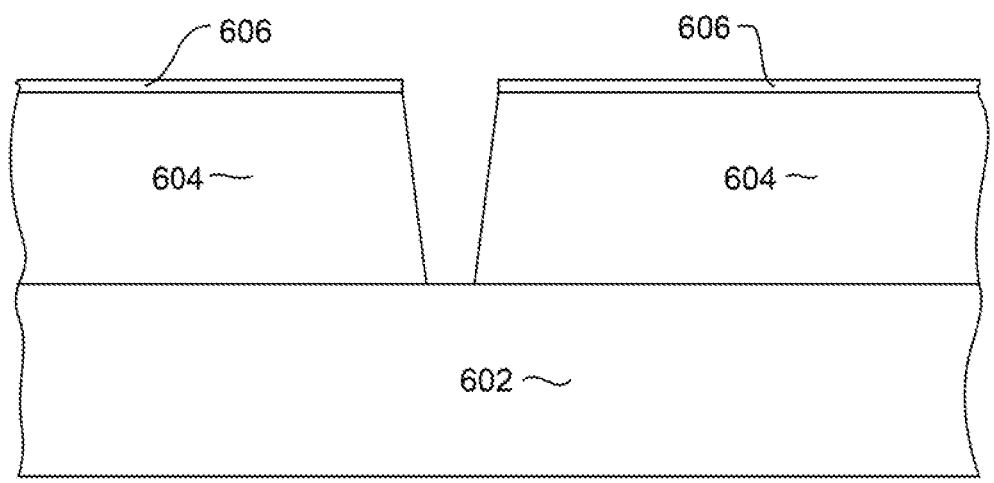

In another, possibly preferred, method a photoresist mask 702 is patterned and developed to form a line and yoke pattern, followed by the deposition of a RIE hard mask layer 606, as shown in FIG. 7(b). The photoresist layer 702 can then be lifted off, leaving an opening in the RIE hard mask layer 606, and a process such as reactive ion etching (RIE) can be used to form a trench in the fill layer 604, leaving a structure such as that shown in FIG. 7(c). The RIE hard mask layer 606 can be a multilayer structure including a layer of Ta and a layer of NiCr formed thereover, or a layer or Ta with a layer of Cr formed there-over, or a layer of NiCr, Cr, or Ru, or combinations thereof.

Figure 8:
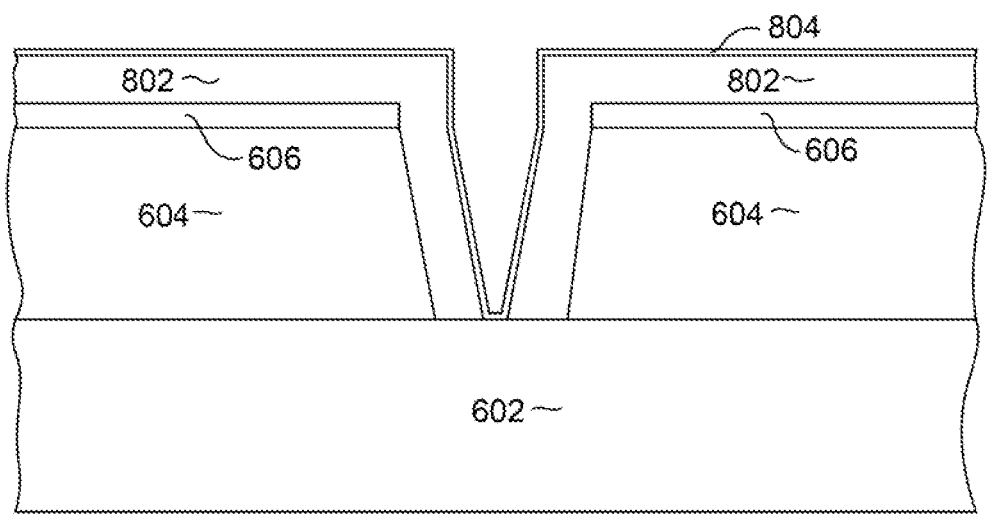

Then, with reference to FIG. 8, a non-magnetic track-width reducing layer 802 is deposited, followed by a CMP resistant material layer 804. The track-width reducing layer 802 can be constructed of alumina ($Al_2O_3$) deposited by a conformal deposition method such as Atomic Layer Deposition (ALD). The CMP resistant layer 804 can be, for example, Ru and can be deposited by Plasma Vapor Deposition (PVD), Atomic Vapor Deposition (AVD) or Atomic Layer Deposition (ALD). As can be seen, the track width reducing layer 802 reduces the width of the opening formed in the RIEable fill layer 604, and in this way reduces the track width of the write pole (as will be seen below). In one embodiment, the trackwidth reduction layer 802 and the CMP resistant layer 804 can be made of the same Ru layer deposited by AVD/ALD.

Figure 9:
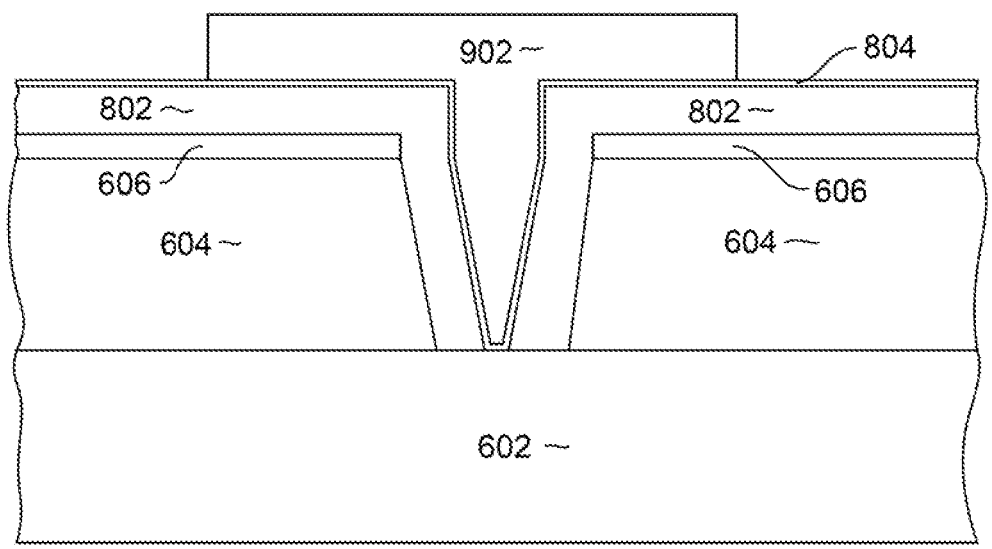
Figure 10:
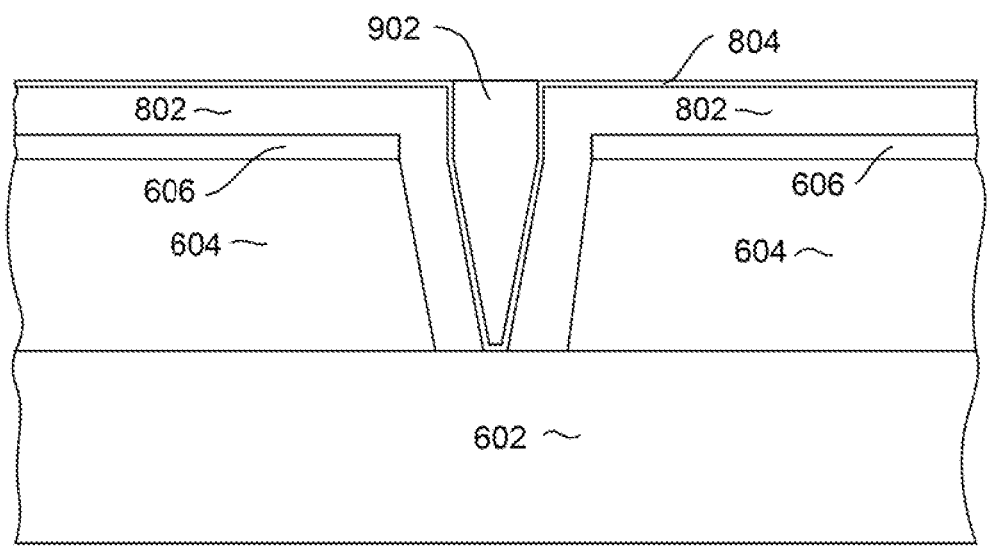

With reference now to FIG. 9, a magnetic material 902 such as CoFe is deposited into the opening in the layers 604, 606, 802, 804. The magnetic material 902 can be deposited by electroplating, using the layer 804 as an electrically conductive, electroplating seed layer. The magnetic material 902 can also be electroplated onto the electroplating seed layer 804 capped with a thin magnetic layer, such as CoFe or CoNiFe. The electroplated layer can be deposited as a full sheet film followed by a patterning process to for discrete pattern for more uniform CMP. Alternatively, the electroplated layer 902 can be produced in two separate steps, consisting of a first layer full film plating followed by a second layer patterned plating using a photoresist frame. The first plated layer is then patterned by ion milling using the second plated layer as mask. Then, a chemical mechanical polishing process (CMP) can be performed, stopping at the CMP stop layer 804, leaving a structure such as that shown in FIG. 10. This, therefore, forms a magnetic write pole 902 using a damascene process.

Figure 11:
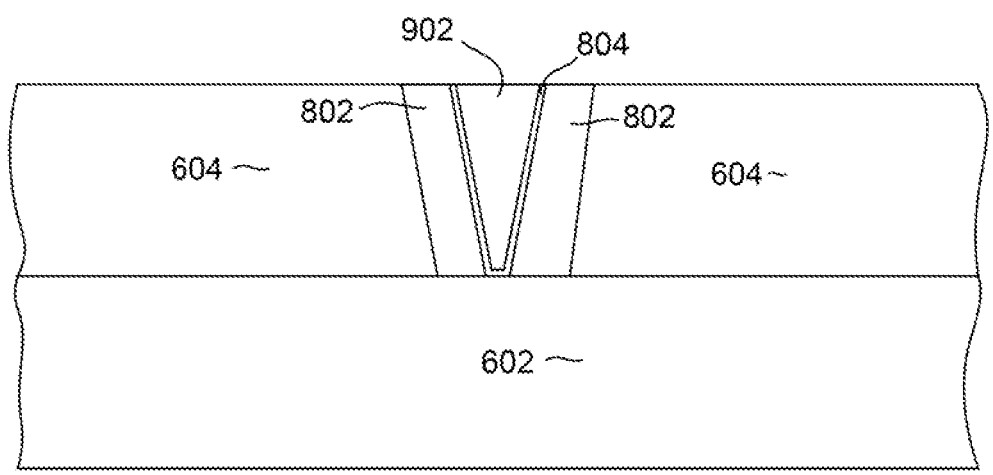
Figure 12:
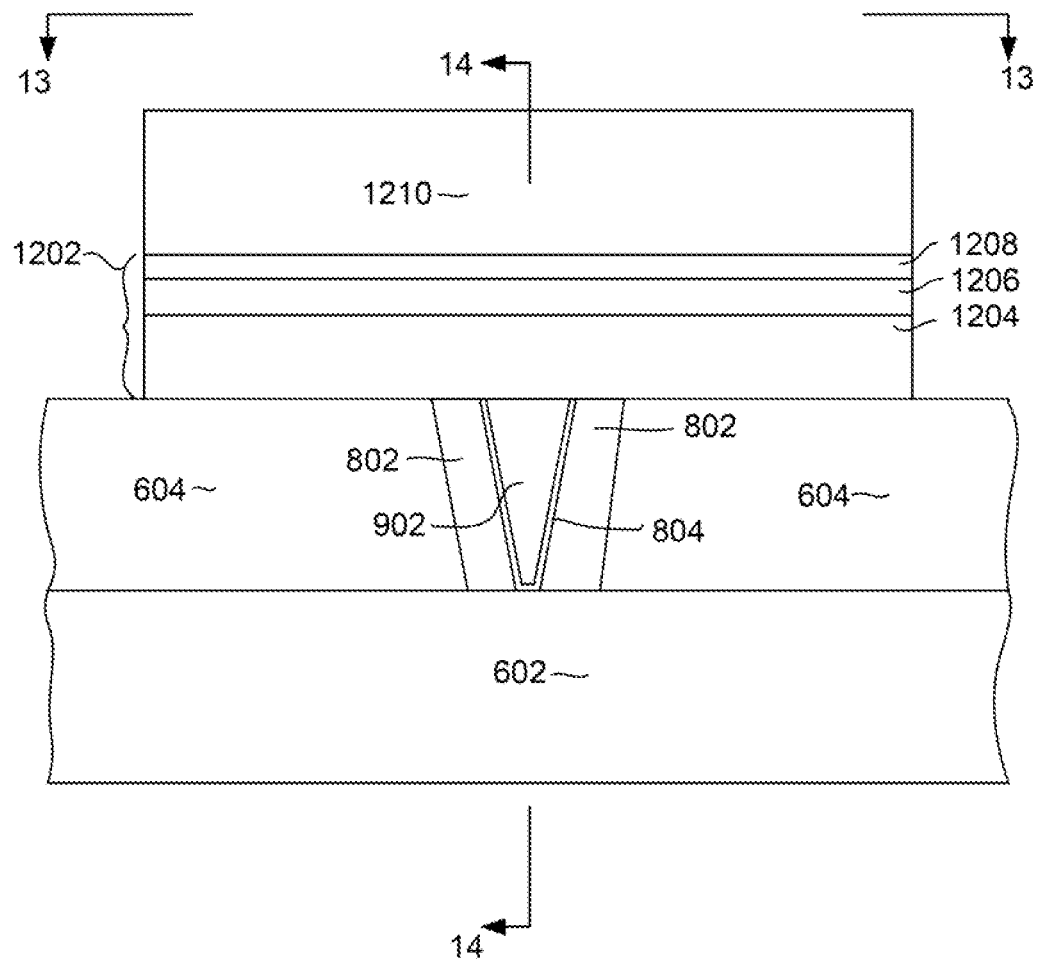
Figure 13:
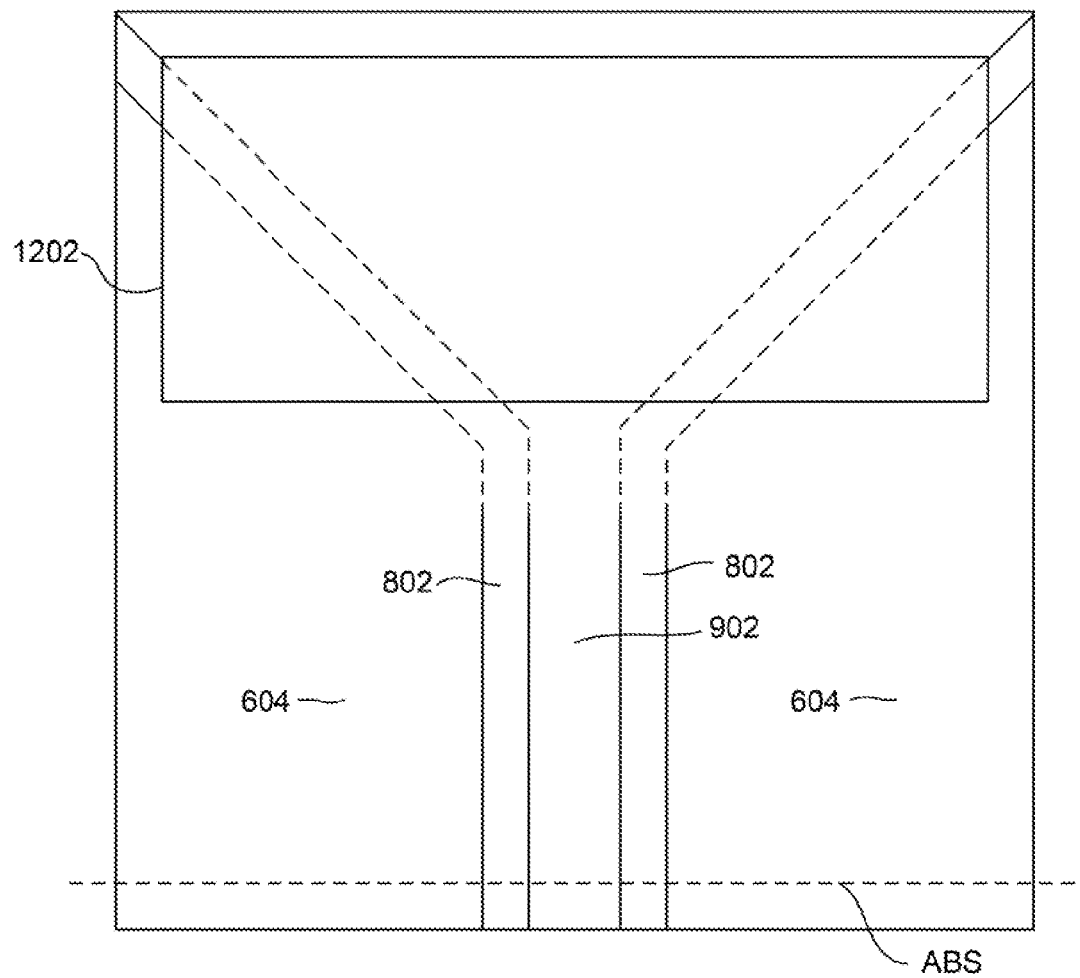

Then, a first material removal process (preferably ion milling) is performed to remove exposed portions of the CMP stop layer 804, ALD layer 802 and RIE hard-mask layer 606, leaving a structure such as that shown in FIG. 11 with the RIEable fill layer 604 exposed. Then, as shown in FIG. 12, a trailing edge taper (TET) hard mask structure 1202 is formed. The TET hard mask can be a multilayer structure including a relatively thick layer of non-magnetic material such as NiCr or Cr 1204, a relatively thick RIEable ion mill hard mask layer 1206 such as SiC or diamond like carbon (DLC) formed over the thick non-magnetic layer 1204 and a thin layer of RIE hard mask material such as NiCr, Cr, NiFe, etc. 1208. The thin RIE hard mask layer 1208 can be as thin as 30 to 40 nm, while the thicker non-magnetic layer 1204 can be 50 to 150 nm or about 100 nm. The TET hard mask structure 1202 can be constructed by depositing the layers 1204, 1206, 1208 as full film layers, then forming a photoresist mask 1210 over the layers 1204, 1206, 1208. The photoresist mask is photolithographically patterned to define a desired shape. Then, a first, quick ion milling process is performed to remove portions of the layer 1208 that are not protected by the photoresist mask 1210, thereby patterning the image of the photoresist masks 1210 onto the layer 1208. Then, a reactive ion etching (RIE) is performed to transfer the image of the layer 1208 onto the underlying layer 1206. A second ion milling can then be performed to transfer the image of the hard mask layer 1206 onto the underlying magnetic layer 1204. The presence of the RIE hard mask layer 1208 allows the image of the photoresist layer 1210 to be transferred onto the ion mill hard mask layer 1206, without requiring the use of an extremely thick photoresist layer 1210 that would otherwise be needed to withstand the RIE and ion mill process. Allowing the photoresist layer 1210 to be thinner provides for greater accuracy in the photolithographic patterning of the photoresist layer 1210.

The reactive ion etching and second ion milling remove the photoresist mask 1210. If any photoresist 1210 remains, this can be removed by chemical liftoff processes familiar to those skilled in the art. The patterned TET hard mask layer has a front edge 1302 that can be seen more clearly with reference to FIG. 13, which shows a top down view taken from lines 13-13 of FIG. 12. The front edge of TET is typically behind flare point with dimension typically in the range of 100-250 nm.

Figure 14:
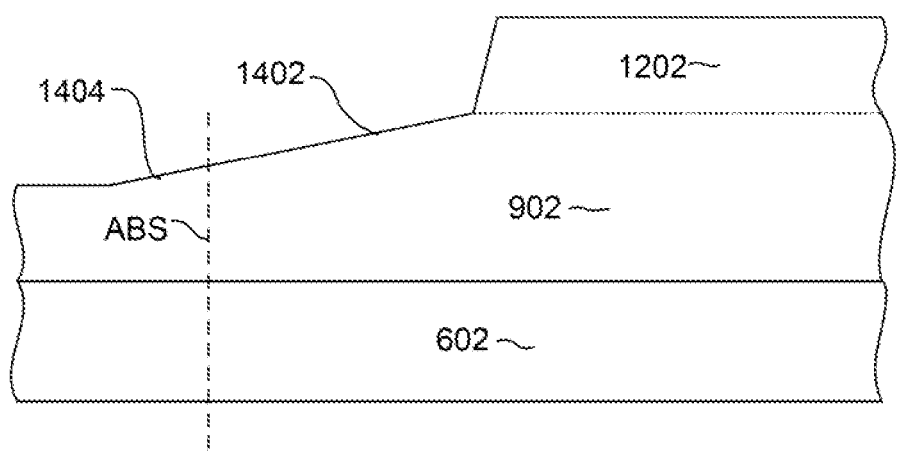

With the TET hard mask 1202 formed by the above series of RIE and ion milling processes. Another ion milling process is performed to define a tapered trailing edge on the write pole. FIG. 14 shows a side cross sectional view. This ion milling (or ion etching) is performed at an angle relative to normal, typically at a tilt angle in the range of 50-60 deg from normal. A rotational milling, sweeping or static milling towards the front or back of the pole or combination thereof can be used to achieved the desired tapered trailing edge angle, and optimized shape of pole top surface.

Shadowing from the TET hard mask 1202 causes the angled ion milling to form a tapered trailing edge 1402 on the magnetic write pole layer 902. Because the shadowing effect is strongest nearest to the TET hard mask 1202, a portion of the pole will have a trailing edge taper extending from the TET hard mask 1202 to the air bearing surface, which resides within the tapered portion of the pole. The tapered portion 1402, preferably has a taper angle of 20-50 degrees relative to an axis that is perpendicular to the air bearing surface (ABS). More preferably, this taper angle is between 22-40 degrees.

Figure 15:
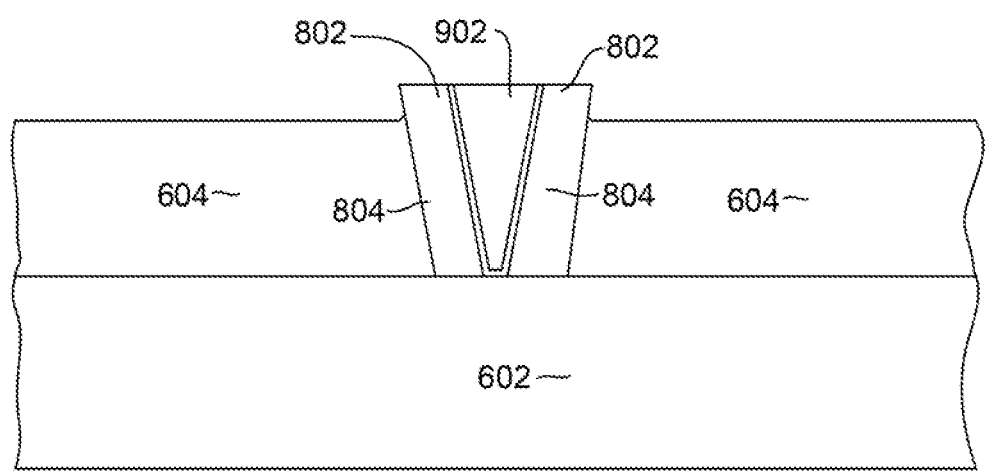
Figure 16:
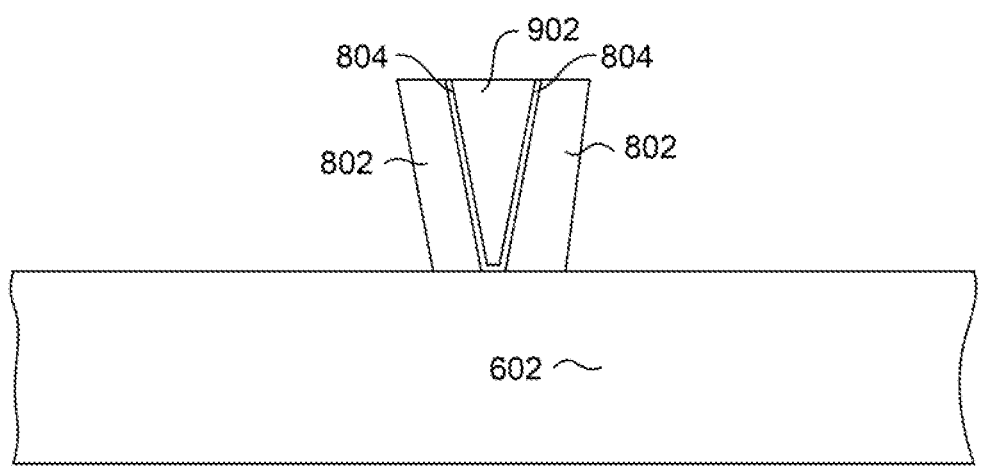

FIG. 15 shows a cross sectional view parallel with, and at or near the ABS, as can be seen, the ion milling used to form the trailing edge tapers 1404, 1402 of FIG. 14 also remove a portion of the RIEable layer 604 at the sides of the write pole 902 and side gaps 802. A reactive ion etching (RIE) is then performed to remove the remaining RIEable fill layer 604, leaving a structure as shown in FIG. 16. This (RIE) is preferably performed with a chemistry such as such as $CHF_3$, $CF_4$, $O_2$, etc. which has a high selectivity for removing $SiO_2$. The view shown in FIG. 16 is a view at a location near the ABS. It should be pointed out, however, that in areas beneath the TET hard mask 1202 (FIG. 14), the RIEable fill layer 604 will be protected from the RIE and will remain after the RIE.

In an alternate embodiment of the invention, the RIEable fill layer 604 can be replaced with alumina and the alumina track width reducing layer 802 and Ru CMP stop layer 804 (FIG. 8) can be replaced by a single, thicker layer of Ru. In that case, a wet etching process can be used to remove the alumina fill layer rather than the RIE described above.

Figure 17:
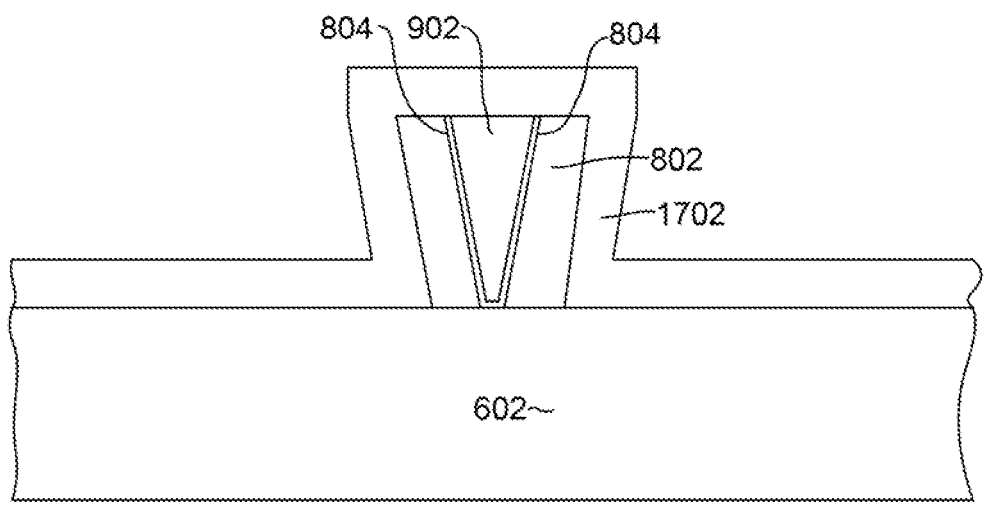
Figure 18:
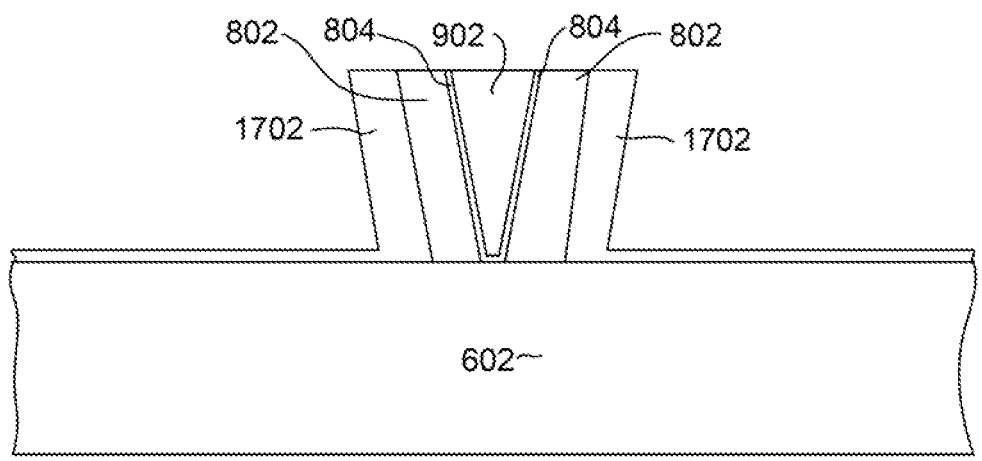

With reference now to FIG. 17, another layer of alumina 1702 is deposited by a conformal deposition method such as atomic layer deposition (ALD). Then, an ion milling is performed to remove horizontally disposed portions of the alumina layer 1702 leaving alumina side walls 1702 as shown in FIG. 18. The total side gap thickness will then include the combined thicknesses of layers 804, 802 and 1702 as shown in FIG. 18.

Figure 19:
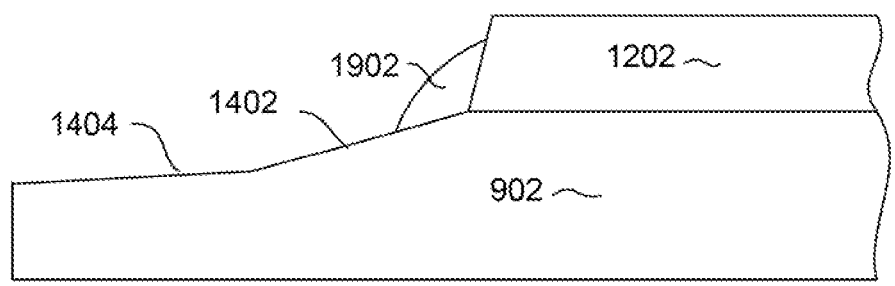

FIG. 19 shows a side cross sectional view of the structure after the ion milling. As mentioned above, the ion milling preferentially removes horizontally disposed portions of the alumina layer, leaving vertical walls of alumina. In the view shown in FIG. 19 the ion milling leaves a layer of alumina 1702 on the front edge 1902 of the TET hard mask 1202. This layer of alumina 1902 extends over a portion of the trailing edge taper 1402. This portion of alumina 1902 will provide a non-magnetic bump for adding additional spacing between the write pole and TET mask 1202 and the yet to be formed trailing shield, as will become clearer below.

Figure 20:
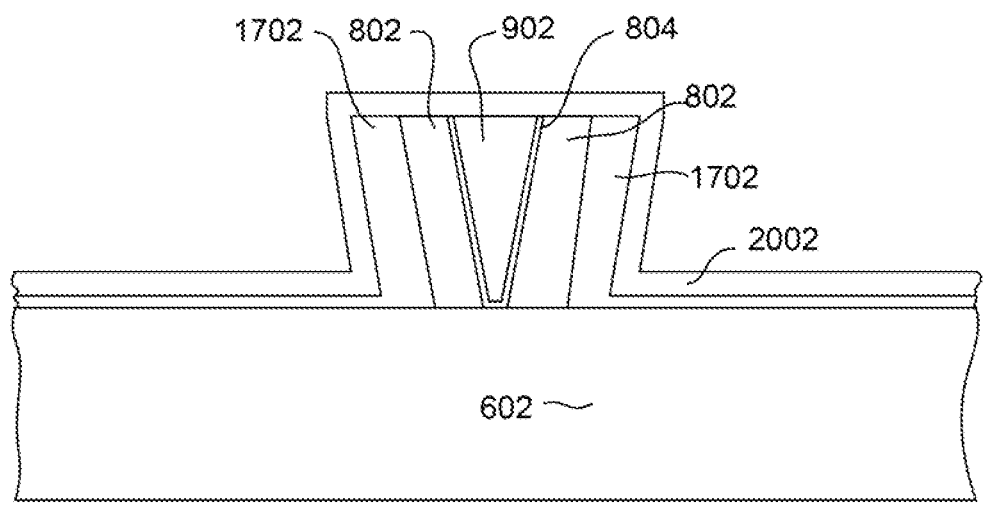
Figure 21:
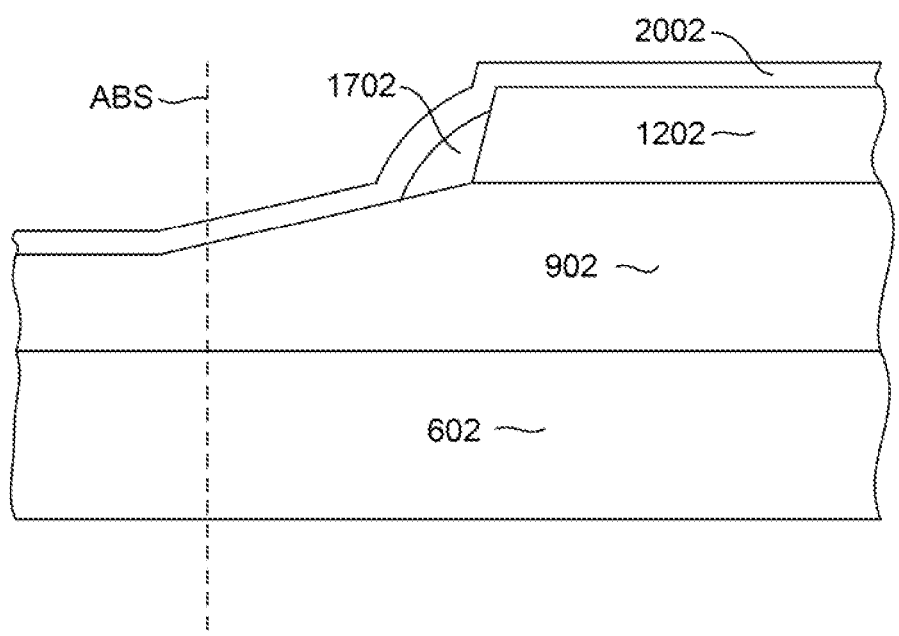

Then, with reference to FIGS. 20 and 21, a non-magnetic trailing gap layer 2002 is deposited. This layer 2002 is preferably a non-magnetic, electrically conductive material such as Ru, and is deposited to a thickness that is chosen to define a trailing gap thickness. As can be seen in FIG. 21, this non-magnetic trailing gap layer extends over the non-magnetic bump 1702 and over the TET hard mask 1202. The non-magnetic trailing gap layer 2002, which as mentioned above can be constructed of Ru, can be deposited by a method such as physical vapor deposition (PVD), ion beam deposition (IBD), or atomic vapor/layer deposition (AVD/ALD).

Figure 22:
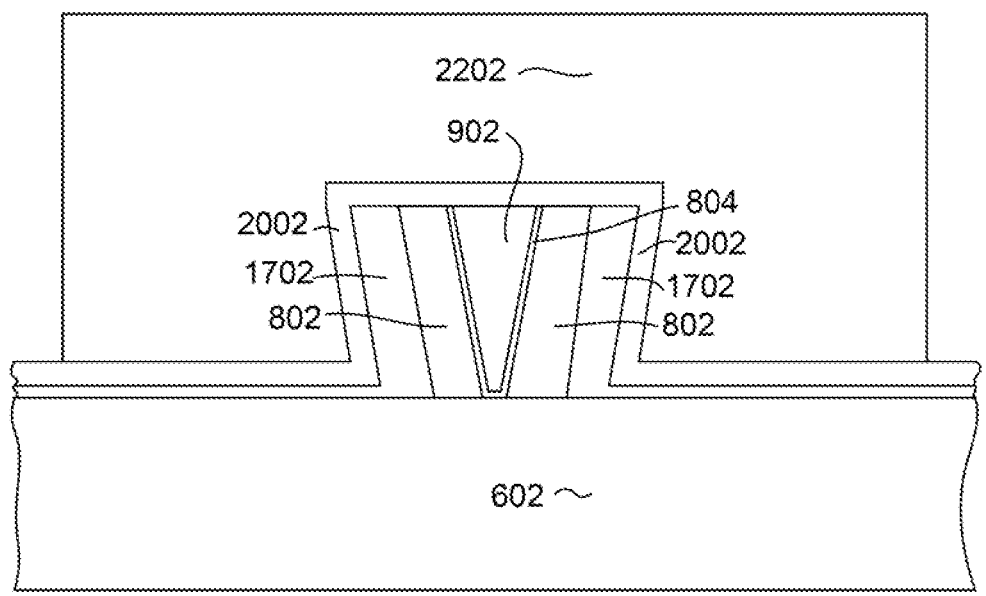
Figure 23:
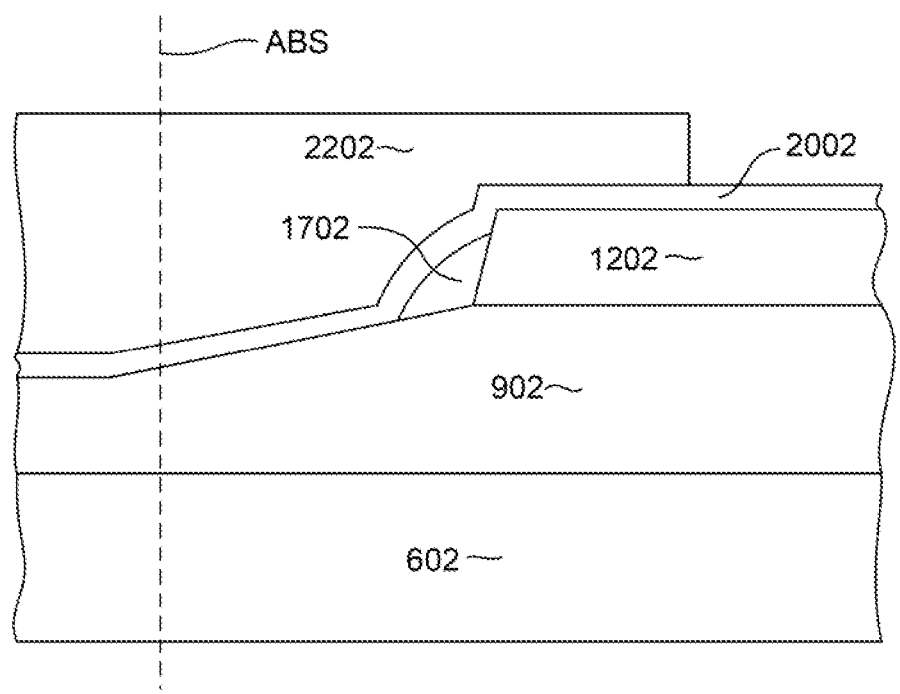

Then, with reference to FIGS. 22 and 23 a magnetic trailing shield 2202 can be formed over the trailing gap layer 2002. This magnetic shield 2202 can be formed by constructing an electroplating frame mask, such as from photolithographically patterned photoresist, and then electroplating a magnetic material such as CoFe, NiFe, CoNiFe, or combinations thereof into the frame mask. The photoresist mask can then be removed, leaving the shield 2202. In another embodiment, the nonmagnetic trailing gap can be made of dielectric alumina deposited by atomic layer deposition. The magnetic shield 2202 can be pattern plated onto a seed layer made of high moment magnetic materials, such as CoFe, CoNiFe, or NiFe.

Although the element numbers have been changed in order to illustrate a method of manufacturing a write head according to an embodiment of the invention it should be understood that several of the elements of the manufactured structure shown in FIG. 23 correspond to elements of the write head described with reference to FIGS. 3 and 4. For Example, the write pole 902 of FIG. 23 corresponds to the write pole 304 of FIG. 3. In addition, the TET hard mask 1202 of FIG. 23 corresponds to the non-magnetic step layer 402 of FIGS. 3 and 4. Because the TET mask 1202 is primarily constructed of a non-magnetic material such as NiCr or Cr, it functions to provide further separation between magnetic pole 304 and trailing shield 312. Also, the non-magnetic bump 1702 of FIG. 23 corresponds to the non-magnetic bump 404 of FIG. 4, the non-magnetic trailing gap layer 2002 of FIG. 23 corresponds to the trailing gap 314 of FIG. 4 and the magnetic shield 2202 of FIG. 23 corresponds to the shield 312 of FIGS. 3 and 4.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head, comprising:
a magnetic write pole;
a non-magnetic step layer formed over a portion of the write pole and terminating at an end that is removed from an air bearing surface;
a tapered trailing edge formed on the write pole, the tapered trailing edge being located between the end of the non-magnetic step layer and the air bearing surface;
a non-magnetic bump formed on the end of the non-magnetic step layer and on a portion of the trailing edge of the write pole;
a non-magnetic trailing gap layer formed over the write pole, the non-magnetic bump and the non-magnetic step layer; and
a magnetic trailing shield formed over at least a portion of the non-magnetic trailing gap layer;
wherein the write pole has first and second laterally opposed sides and wherein the trailing shield is a wrap around shield that extends down beside the first and second sides of the write pole and is separated from the first and second sides of the write pole by first and second non-magnetic side-gap layers.

2. The magnetic write head as in claim 1 wherein the non-magnetic step layer comprises NiCr.

3. The magnetic write head as in claim 1 wherein the non-magnetic step layer comprises Cr.

4. The magnetic write head as in claim 1 wherein the first and second non-magnetic side gap layers each comprise two layer of non-magnetic material.

5. The magnetic write head as in claim 1 wherein the first and second non-magnetic side gap layers each comprise a plurality of layers.

6. The magnetic write head as in claim 1 wherein the side gap layers each comprise a layer of alumina and a layer of Ru.

7. The magnetic write head as in claim 1 wherein the side gap layers are each a multi-layer structure including a plurality of sub-layer each of which comprises Al or Ru.

8. The magnet write head as in claim 1 wherein the non-magnetic step layer comprises a layer of non-magnetic material having a thickness of 50 to 150 nm.

9. The magnetic write head as in claim 1 wherein the non-magnetic bump layer comprises alumina.

10. The magnetic write head as in claim 1 wherein the magnetic write pole has a trailing edge with a taper angle in the range of 20-50 degree relative to an axis that is perpendicular to the air bearing surface (ABS).

* * * * *